(12) United States Patent
Bushman (10) Patent No.: US 11,272,722 B2
(45) Date of Patent: Mar. 15, 2022

(54) HIGH PRESSURE PROCESSING INDICATOR

(71) Applicant: Multi-Color Corporation, Batavia, OH (US)

(72) Inventor: Alexander Craig Bushman, Loveland, OH (US)

(73) Assignee: Multi-Color Corporation, Batavia, OH (US)

(*) Notice: Subject to any disclaimer, the term of this patent is extended or adjusted under 35 U.S.C. 154(b) by 116 days.

(21) Appl. No.: 16/600,656

(22) Filed: Oct. 14, 2019

(65) Prior Publication Data

US 2020/0037639 A1 Feb. 6, 2020

Related U.S. Application Data (62) Division of application No. 15/425,506, filed on Feb. 6, 2017, now abandoned.

(51) Int. Cl.
*G01L 7/00* (2006.01)
*B65D 79/00* (2006.01)
(Continued)

(52) U.S. Cl.
CPC ............ *A23L 3/001* (2013.01); *A23L 3/003* (2013.01); *A23L 3/0155* (2013.01);
(Continued)

(58) Field of Classification Search
None
See application file for complete search history.

(56) References Cited

U.S. PATENT DOCUMENTS

| 5,325,721 A | 7/1994 | Pendergrass, Jr. |
| 5,535,676 A | 7/1996 | Buschulte et al. |
(Continued)

FOREIGN PATENT DOCUMENTS

| DE | 2325567 A1 | 11/1974 |
| EP | 0747871 A2 | 12/1996 |

OTHER PUBLICATIONS

International Search Report in International Patent Application No. PCT/US2018/016982, dated Apr. 20, 2018, 5 pgs.
(Continued)

*Primary Examiner* — Andre J Allen
(74) *Attorney, Agent, or Firm* — Wood Herron & Evans LLP (57) ABSTRACT

A device for indicating exposure to a pressure. The device may include a base layer, a plurality of microcapsules, and a coating, with the microcapsules being disposed between the base layer and the coating. The microcapsules contain a indicator material that can be released once the microcapsules burst. The microcapsules then have a compressive bursting strength that is chosen or designed to be less than a selected pressure (e.g., the pressure being that to which a particular article may be exposed during high pressure processing). Thus, when the device is subjected to a pressure greater than the compressive bursting strength, at least some microcapsules burst, the indicator material is released from the microcapsules, and the release of the indicator material can be detected by observation of the device. The device may be a label that is associated (such as by being affixed) to the article being subjected to pressure (or multiple labels being associated (such as by being affixed) to multiple articles. Alternatively, the device may be associated with an article or articles without being affixed thereto.

14 Claims, 4 Drawing Sheets

(51) Int. Cl.
*G01N 31/22* (2006.01)
*A23L 3/00* (2006.01)
*C09D 11/037* (2014.01)
*C09D 11/101* (2014.01)
*C09J 133/00* (2006.01)
*A23L 3/015* (2006.01)
*G01L 7/18* (2006.01)
*C09B 67/02* (2006.01)
*B65D 79/02* (2006.01)
*G01L 13/02* (2006.01)

(52) U.S. Cl.
CPC ........... *B65D 79/008* (2020.05); *B65D 79/02* (2013.01); *C09B 67/0097* (2013.01); *C09D 11/037* (2013.01); *C09D 11/101* (2013.01); *C09J 133/00* (2013.01); *G01L 7/187* (2013.01); *A23V 2002/00* (2013.01); *B65D 2203/12* (2013.01); *G01L 13/028* (2013.01); *G01N 31/22* (2013.01)

(56) References Cited

U.S. PATENT DOCUMENTS

| | | | |
|---|---|---|---|
| 6,610,351 B2 | 8/2003 | Shchegolikhin et al. | |
| 8,640,546 B2 | 2/2014 | Trahan et al. | |
| 8,883,049 B2 | 11/2014 | Clayton et al. | |
| 8,921,264 B2 | 12/2014 | Clayton et al. | |
| 9,085,192 B2 | 7/2015 | Clayton et al. | |
| 9,175,175 B2 | 11/2015 | Clayton et al. | |
| 9,187,668 B2 | 11/2015 | Owen et al. | |
| 9,216,397 B2 | 12/2015 | Owen et al. | |
| D752,456 S | 3/2016 | Valdez | |
| 9,345,270 B2 | 5/2016 | Owen et al. | |
| 9,399,716 B2 | 7/2016 | Wang et al. | |
| 9,493,668 B2 | 11/2016 | Clayton et al. | |
| 2008/0020165 A1 | 1/2008 | Drori | |
| 2009/0041833 A1 | 2/2009 | Bettinger et al. | |
| 2010/0009042 A1 | 1/2010 | Fujikawa et al. | |
| 2010/0275676 A1 | 11/2010 | King et al. | |
| 2013/0061681 A1 | 3/2013 | Trahan et al. | |
| 2017/0122855 A1 | 5/2017 | Dantus et al. | |
| 2018/0120275 A1 | 5/2018 | Wang et al. | |
| 2019/0011318 A1* | 1/2019 | Wang | B65D 85/72 |

OTHER PUBLICATIONS

Office Action in U.S. Appl. No. 15/425,506, dated Apr. 2, 2019, 9 pgs.
Office Action in U.S. Appl. No. 15/425,506, dated Aug. 6, 2018, 11 pgs.
Written Opinion in International Patent Application No. PCT/US2018/016982, dated Apr. 20, 2018, 8 pgs.

* cited by examiner

HIGH PRESSURE PROCESSING INDICATOR

CROSS-REFERENCE TO RELATED APPLICATION

This application is a divisional of U.S. Patent Application Publication No. 2018/0220681 A1 (U.S. patent application Ser. No. 15/425,506), filed on Feb. 6, 2017, the disclosure of which is incorporated by reference herein in its entirety.

FIELD OF THE INVENTION

The present invention relates generally to the field of high pressure processing of articles, and more specifically to a system for indicating whether an article has been subjected to high pressure processing in order to, for example, reduce or eliminate the risk of microbial growth in or on the article.

BACKGROUND OF THE INVENTION

This section is intended to introduce the reader to various aspects of art that may be related to various aspects of the present invention, which are described and/or claimed below. This discussion is believed to be helpful in providing the reader with background information to facilitate a better understanding of various aspects of the present invention. Accordingly, it should be understood that these statements are to be read in this light, and not as admissions of prior art.

Foodstuffs intended for human or other animal consumption are susceptible to microbial contamination, especially during handling and processing, and such contamination can continue and increase during storage. Furthermore, natural components (e.g., endogenous enzymes) in foodstuffs such as vegetables, fruits, and meats can exert degradative effects upon the foodstuff during storage, even in the absence of microbial contamination. Therefore, a need exists for methods of reducing spoilage and degradation of foodstuffs during storage. One such method that has been used is high pressure processing ("HPP").

HPP, (also known as high hydrostatic pressure processing, pascalization, and bridgmanization), is a method of preserving and sterilizing products (such as food), in which a product is processed under very high pressure, leading to the inactivation of certain microorganisms and enzymes in the product. Articles, such as food items, are subjected to pressure for a duration of time sufficient to reduce the biological activities of cells and their components, thereby decreasing the likelihood that cells subjected to such processing will continue to metabolize or reproduce.

In HPP techniques, food or other articles are often sealed in a container prior to subjecting the sealed container to high pressure, such as 25,000 psi-120,000 psi. Because gases are highly compressible at such pressures, some or substantially all gases can be removed from the container prior to sealing it, such as by evacuating gases from the container or by filling the container with liquid prior to sealing it. Liquids and solids, being relative incompressible at these pressures, tend to transmit pressure throughout their volume, provided there are no rigid articles present (e.g., thick, hollow bones or shells capable of preventing transmission of isotropically applied pressure to their interior). Pressure can be applied to the exterior of the article or the exterior of the container containing the article and transmitted throughout the article. In practice, pressurization is often achieved in a sturdy device designed for accommodating one or more articles during such pressurization.

The pressures present during HPP ruptures cell walls, which in turn destroys microorganisms, such as bacteria. Factors encouraging growth and function of microorganisms further get disrupted. Further, during HPP, the food's proteins are denatured, hydrogen bonds are fortified, and non-covalent bonds in the food are disrupted, while the product's main structure remains intact. Because HPP is not heat-based, covalent bonds are not affected, causing no change in the food's taste. Thus, HPP can be used to reduce or eliminate the danger from microorganisms contaminating food without influencing the food's molecular level and therefore its nutritional value, vitamins and minerals, flavor, taste, and color.

One drawback with HPP is that many articles that have been subjected to HPP appear similar to or indistinguishable from articles that have not been subjected to HPP. Any inability to distinguish between treated and non-treated articles can lead to confusion among treated and non-treated articles, and misidentification as to which articles have been treated. In many facilities, treated articles and non-treated articles may be in close proximity to one another. In such situations, the appearance of the articles is insufficient to determine HPP treatment status, and thus one may mistake a non-treated article for a treated article. This could result in non-treated (and potentially contaminated) articles getting into the product stream.

Also, because the pressurization equipment used in HPP can sometimes fail to achieve the desired or requisite degree or duration of pressurization, such failures can be difficult to perceive (based on visual observation). Again, this could result in articles that have failed to be properly processed getting into the product stream.

Some have attempted to provide an indicator that can be associated with an article intended to be subjected to HPP, wherein the indicator undergoes a readily-observable change of appearance upon HPP (and does not undergo the change absent HPP).

By way of example, European Patent Application publication no. 2116481 discloses an irreversible pressure-sensitive marker in which pigment-containing microcapsules are disposed between a rigid base member and a transparent film. When subjected to HPP, the rigid base member retains its shape and anisotropic force is applied to the microcapsules by the transparent film, resulting in rupture of the microcapsules, escape of the hitherto-contained pigment, and visibility of the pigment through the film. In view of the high pressures used during HPP and the corresponding expense of providing a rigid base member capable of retaining its shape under such pressures so as to exert anisotropic force upon the microcapsules, such a system can be economically impractical for common use.

As another example, U.S. Pat. No. 8,640,546 discloses a pressure sensor device and its use for confirming achievement of a selected pressure in a high pressure process (HPP) for sanitizing food. The device includes at least a base and a sheet, each of which is substantially impermeable to the working fluid of the HPP and is deformable at the selected pressure. Microcapsules interposed between flat overlapping portions of the base and sheet contain a color former and burst upon pressurization of the environment surrounding the device. Release of the color former is detected to confirm that the pressurization occurred. The device can be associated with one or more foodstuffs (e.g., a packaged food product or a group of such packages) and remain associated therewith to continuously indicate that the foodstuff(s) have been subjected to the selected pressure and are therefore sanitized. According to the '546 patent, the device disclosed therein is based on a new use of an off-the-shelf product that was not thought to work for indicating pressure (such as products that have undergone HPP). This is because it was generally thought that microcapsules would not burst under anisotropic pressure. However, the '546 patent describes that the base and the sheet (disposed on either side of the microcapsules can move toward one another under anisotropic pressure, thereby crushing the microcapsules in between and causing them to burst. Thus, the '546 patent relies on the use of rigid, substantially flat sheets on either side of the microcapsules to provide the device.

SUMMARY OF THE INVENTION

Certain exemplary aspects of the invention are set forth below. It should be understood that these aspects are presented merely to provide the reader with a brief summary of certain forms the invention might take and that these aspects are not intended to limit the scope of the invention. Indeed, the invention may encompass a variety of aspects that may not be explicitly set forth below.

One aspect of the present invention is directed to a device for indicating exposure to a pressure. One embodiment of the device may include a base layer, a plurality of microcapsules, and a coating, with the microcapsules being disposed between the base layer and the coating. The microcapsules of this embodiment contain a indicator material that can be released once the microcapsules burst. The microcapsules then have a compressive bursting strength that is chosen or designed to be less than a selected pressure (e.g., the pressure being that to which a particular article may be exposed during HPP). Thus, when the device is subjected to a pressure greater than the compressive bursting strength, at least some microcapsules burst, the indicator material is released from the microcapsules, and the release of the indicator material can be detected by observation of the device (which may be by visual observation of the device). The device of this aspect of the invention may be a label that is associated (such as by being affixed) to the article being subjected to pressure (or multiple labels being associated (such as by being affixed) to multiple articles. Alternatively, the device may be associated with an article or articles without being affixed thereto (as a label would be); such a device may be subjected to HPP with the article or articles to indicate at the end of the process that a desired pressure was achieved during the process.

Another aspect of the present invention is directed to a particular embodiment of the device, that embodiment being a label for indicating exposure to a pressure. Such a label may be a pressure sensitive label, a shrink sleeve label, an in-mold label, or a heat transfer label. In certain embodiments (where the label is a pressure sensitive label or an in-mold label, for example), the label may include a base layer, a plurality of microcapsules, and a top layer, with the microcapsules being disposed between the base layer and the top layer. The label further includes an adhesive layer disposed adjacent to the base layer such that the base layer is positioned between the adhesive layer and the plurality of microcapsules. The microcapsules of this embodiment contain a indicator material that can be released once the microcapsules burst. The microcapsules then have a compressive bursting strength that is chosen or designed to be less than a selected pressure (e.g., the pressure being that to which a particular article may be exposed during HPP). Thus, when the label is subjected to a pressure greater than the compressive bursting strength, at least some microcapsules burst, the indicator material is released from the microcapsules, and the release of the indicator material can be detected by observation of the label (such as by visual observation).

In another embodiment (where the device is a heat transfer label, for example), the label may include an adhesive layer, a plurality of microcapsules, and a top layer, the plurality of microcapsules being disposed between the adhesive layer and the top layer. The microcapsules of this embodiment contain a indicator material that can be released once the microcapsules burst. The microcapsules then have a compressive bursting strength that is chosen or designed to be less than a selected pressure (e.g., the pressure being that to which a particular article may be exposed during HPP). Thus, when the label is subjected to a pressure greater than the compressive bursting strength, at least some microcapsules burst, the indicator material is released from the microcapsules, and the release of the indicator material can be detected by observation of the label (which may be visual observation).

In another embodiment (where the device is a shrink sleeve label, for example), the label may include a shrink film and a plurality of microcapsules being disposed proximal to a surface of the shrink film. The microcapsules of this embodiment contain a indicator material that can be released once the microcapsules burst. The microcapsules then have a compressive bursting strength greater than a first pressure achieved by shrinkage of the shrink film to an article, but less than a selected second pressure (e.g., the pressure being that to which a particular article may be exposed during HPP). Thus, when the label is subjected to a pressure greater than the compressive bursting strength, at least some microcapsules burst, the indicator material is released from the microcapsules, and the release of the indicator material can be detected by observation of the label (which may be visual observation).

Another aspect of the present invention is directed to an assembly for indicating achievement of a selected pressure in a high pressure process for treating a foodstuff. In one embodiment, the assembly provides a foodstuff reliably associated with a device. The device includes a base layer, a plurality of microcapsules, and a coating, with the microcapsules being disposed between the base layer and the coating. The microcapsules of this embodiment contain a indicator material that can be released once the microcapsules burst. The microcapsules then have a compressive bursting strength that is chosen or designed to be less than a selected pressure (e.g., the pressure being that to which a particular article may be exposed during HPP). Thus, when the device is subjected to a pressure greater than the compressive bursting strength, at least some microcapsules burst, the indicator material is released from the microcapsules, and the release of the indicator material can be detected by observation of the device (which may be visual observation). The device of this aspect of the invention may be a label that is associated (such as by being affixed) to the article being subjected to pressure (or multiple labels being associated (such as by being affixed) to multiple articles. Alternatively, the device may be associated with an article or articles without being affixed thereto (as a label would be); such a device may be subjected to HPP with the article or articles to indicate at the end of the process that a desired pressure was achieved during the process.

BRIEF DESCRIPTION OF THE DRAWINGS

The accompanying drawings, which are incorporated in and constitute a part of this specification, illustrate embodiments of the invention and, together with the general description of the invention given above and the detailed description of the embodiments given below, serve to explain the principles of the present invention.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
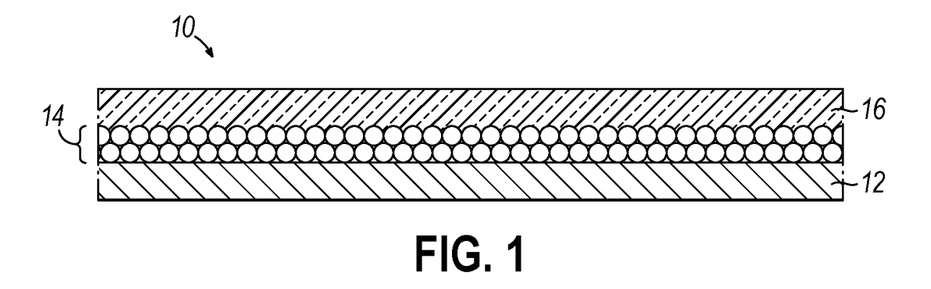
FIG. 1 is a cross-sectional view of one embodiment of a device for indicating exposure to a pressure.

As described above, one aspect of the present invention is directed to a device 10 for indicating exposure to a pressure. Referring now to FIG. 1, one embodiment of the device 10 may include a base layer 12, a plurality of microcapsules 14, and a coating 16, with the microcapsules 14 being disposed between the base layer 12 and the coating 16. While the figures schematically show only the plurality of microcapsules 14 between base layer 12 and coating 16, it is also contemplated that the microcapsules may be included as a component within a material that forms the layer including the plurality of microcapsules 14 between the base layer 12 and coating 16. The microcapsules 14 of this embodiment contain a indicator material 18 that can be released once the microcapsules 14 burst. The microcapsules 14 have a compressive bursting strength that is less than a selected pressure (e.g., the selected pressure being that to which a particular article 22 may be exposed during HPP). Thus, once the selected pressure is known, the microcapsules may be designed such that they will burst at that selected pressure, or at some pressure that is less than the selected pressure. Without being limited, one manner in which this may be accomplished is by increasing the thickness of the microcapsule wall (the thicker the wall, the greater the compressive bursting strength). Thus, when the device 10 is subjected to a pressure greater than the compressive bursting strength, at least some microcapsules 14 burst, the indicator material 18 is released from the microcapsules 14, and the release of the indicator material 18 ultimately can be detected by observation of the device 10. The device 10 of this aspect of the invention may be a label 20 that is associated with the article 22 (such as by being affixed thereto) being subjected to pressure [or multiple labels 20 being associated to multiple articles 22 (such as by being affixed thereto]. Alternatively, the device 10 may be associated with an article 22 or articles 22 without being affixed thereto (as a label 20 would be); such a device 10 may be subjected to HPP with the article 22 or articles 22 to indicate at the end of the process that a pressure greater than the compressive bursting strength was achieved during the process.

As noted above, the device 10 of this embodiment of the present invention includes a coating 16 adjacent the plurality of microcapsules 14 (such that the microcapsules 14 are disposed between the coating 16 and the base layer 12). In certain embodiments, the coating 16 may comprise a varnish. And, in certain embodiments, the coating 16 may be UV-curable. In one particular embodiment, an example of a varnish that may be used as the coating 16 is of acrylate chemistry—and may be about 20%-25% acrylate monomer, about 32.5%-75% acrylated oligomers, and about 5%-10% 2-propenoic acid, 1,1'-[(1-methyl-1,2-ethanediyl)bis[oxy (methyl-2,1-ethanediyl)]] ester, reaction products with diethylamine. In particular, one such varnish is SunCure RCIFV0341665, commercially available from Sun Chemical of Parsippany, N.J. By providing a coating 16 as a top layer 30 to the device 10, this embodiment eliminates the use and need for a film overlying the microcapsules and placing the microcapsules between a base layer and top layer (as is done in certain prior art; and which that prior art suggests is necessary). The elimination of a film overlying the microcapsules 14 reduces the overall cost of the construction and reduces the complexity required to produce the device as all layers may be applied with a printing process.

Additionally, as described above, the device 10 includes a base layer 12. In general, the base layer 12 may comprise a material such as those that would typically be used as facestock in one or more types of labels 20 (e.g., a pressure sensitive label 20). In certain embodiments, the base layer 12 may comprise a film or paper. In one particular embodiment, the base layer 12 may be a film including (but not limited to) polypropylene, biaxially-oriented polypropylene, and/or polyester. Further, the base layer 12 may be clear or opaque in certain embodiments. An example of a film that may be used as the base layer 12 is a 2.4 mil white biaxially-oriented polypropylene (BOPP) film, commercially available from Avery Dennison's Fasson Roll Division (of Avery Dennison, Glendale, Calif.) and used within typical pressure sensitive label products including (but not limited to) a construction including 2.4 mil white BOPP, an acrylic adhesive, and a 1.2 mil PET liner (such a construction is commercially available from Avery Dennison under specification #79481).

Further, as described, the device 10 includes a plurality of microcapsules 14 having a indicator material 18 therein. Processes for making microcapsules 14, and the materials used for same (including those containing solid and/or liquid reagents) are well known, and substantially any such methods and compositions can be used to make the microcapsules 14 of the device 10 described herein. As described above, in the embodiment of FIG. 1, the microcapsules 14 are located between the base layer 12, and coating 16. The microcapsules 14 can, for example, be bound to the base layer 12, to the coating 16, or to both, either directly or by way of a binding agent. Alternatively, the microcapsules 14 can be contained within, but not necessarily bound to any surface within the device 10.

The indicator material 18 disposed within the plurality of microcapsules 14 may be, for example, any substance that will undergo a color change (e.g., from clear to colored, or from one color to another color, or from colored to clear, etc.) either by itself, or when combined with another substance (e.g., the indicator material may be originally segregated from another substance within microcapsules, but brought into contact with such other substance once microcapsules burst and the indicator material is released). In one embodiment, the indicator material 18 disposed within the plurality of microcapsules 14 of the device 10 may include at least one ink. In one embodiment, the at least one ink may include a leuco dye. As is known to those of ordinary skill in the art a leuco dye is a dye which can switch between two chemical forms—one of which is colorless. Further, the ink (whether comprising a leuco dye or not) may be UV curable. An example of an ink that may be used as the at least one ink of the indicator material 18 is commercially available from Chromatic Technologies Incorporated, of Colorado Springs, Colo. under product number 9BOXX38E0327. Such an ink may include an acrylic oligomer, polyester acrylate, amine modified polyester acrylate, tripropylene glycol diacrylate, one or more photoinitiators, and a melamine polymer.

Alternatively to the use of a leuco dye that can change from colorless to colored upon the application of pressure, is the use of a color forming substance within the microcapsules 14, and a color developing substance outside the microcapsules 14. For example, in one embodiment, one of the base layer 12 and the coating 16 may include the microcapsules 14 adjacent thereto, and the other may include a color developer adjacent thereto that reacts with the indicator material 18 to generate a colored product upon release of the indicator material 18. Further, by way of example, the indicator material 18 can be colorless or have a color different than (or less intense than) the colored product.

In other embodiments, the indicator material 18 may not be a material that forms a color (or a different color) upon exposure to pressure or exposure to a second substance. For example, the indicator material 18 may be a material that can be caused to fluoresce in order to determine if the device has been exposed to sufficient pressure to burst the microcapsules and release the indicator material.

As described above, the microcapsules 14 are characterized by a compressive bursting strength (which may be a range of strengths for individual microcapsules 14 within the plurality) at which the indicator material 18 will be released from within the microcapsules 14. If a pressure (e.g., an anisotropic pressure, such as that in HPP) greater than the compressive bursting strength of the microcapsules 14 is applied to the microcapsules 14 (such as by the base layer 12 and/or the coating 16), then at least one or more of the microcapsules 14 will burst, and the indicator material 18 will be released and can be detected. For that reason, the compressive bursting strength of the microcapsules 14 in a device 10 used for detecting achievement of a selected pressure should be not greater than (and, in embodiments, at least a little less than) the selected pressure to which the device 10 will be subjected.

In alternative embodiments, the microcapsules 14 can have a specified compressive bursting strength, or a range of compressive bursting strengths, as is known in the art. The compressive bursting strength can be selected, for example to be a fraction (e.g., half, 90%, 99%, or some other proportion) of the selected pressure of the process. In one embodiment, the compressive bursting strength that may be used can be determined empirically and can, for example, be about 5% of the selected pressure. As is known to those skilled in the art, HPP operates at very high pressures—e.g., 87,000 psi, 100,000 psi, etc. However, it may be the case that pressures that are only a fraction of the pressures of HPP—e.g., 5,000 psi—are pressures that would not be encountered by an article in the manufacturing, processing, shipping, or consumer stream unless they had crossed that threshold of pressure while being exposed to a process such as HPP. Thus, selection of a compressive bursting strength that is only, for example, 5% of the selected pressure (e.g., the pressure of HPP) can be enough to indicate that the article has undergone a high pressure process, such as HPP. However, this does not limit the compressive bursting strength to 5% of the selected pressure. Depending on need, any compressive bursting strength may be used, provided it is selected such that at least some of the microcapsules will burst at a pressure that is equal to or less than the selected pressure of the process. Further, because pressurization apparatus may fail or achieve only partial pressurization, the compressive bursting strength of the microcapsules 14 in the device 10 described herein (or at least some of the microcapsules) can instead be simply selected to be significantly greater than atmospheric pressure.

The device 10 described herein can include microcapsules 14 that exhibit a range of compressive bursting strengths. By way of example, the microcapsules 14 can include some which burst at a relatively low (e.g., 100 psi) compressive pressure and some which burst at a substantially greater (e.g., 87,000 psi) compressive pressure, and the two populations of microcapsules 14 can have the same or different indicator materials 18 contained within them. Furthermore, the two populations can be disposed on the same portion of the device 10 or in different portions. In one embodiment, the device 10 includes several populations of microcapsules 14, each having a characteristic range of compressive bursting strengths and being disposed in an arrangement that facilitates observation of their bursting, such as by arranging the populations sequentially in order of increasing compressive bursting strength and by including indicia on or within the device 10 that correlates color formation in one of the sequentially-ordered areas with a pressure.

At least one of the base layer 12 and the coating 16 preferably has a viewing portion adapted to permit detection of indicator material 18 released from the microcapsules 14 by external visual observation of the device 10. In one particular embodiment, at least one of the base layer 12 and coating 16 is sufficiently transparent or translucent that release of indicator material 18 from the microcapsules 14 can be detected by direct visual observation. As such (i.e., because the viewing portion of this embodiment is provided by the transparency or translucence of one or more materials of the device 10), it is not shown in the figures. However, in other embodiments, the device may include a viewing portion that is an opening (such as a window) such that any change, such as a color change, may be observed via such opening.

As described above, the indicator material 18 may include a leuco dye that changes from colorless to colored. In further embodiments, the indicator material 18 may also exhibit the ability to change from a colored ink to a colorless or clear ink when exposed to a particular temperature. This may be useful in applications where an article 22 needs to be pressurized (so as to reduce or eliminate any microorganisms) and then kept cool (as many foodstuffs need to be kept refrigerated). Once such an article 22 is subjected to HPP and then kept refrigerated (whether for transport or otherwise), the presence of coloration would indicate that the article 22 has been subjected to the desired or required pressure, and has also been kept at adequate temperature following HPP. In one embodiment, the indicator material 18 may revert from a colored state to colorless or clear following exposure to a temperature equal to or greater than a temperature chosen from 70° F., 104° F., 120° F., and 150° F.

Figure 2:
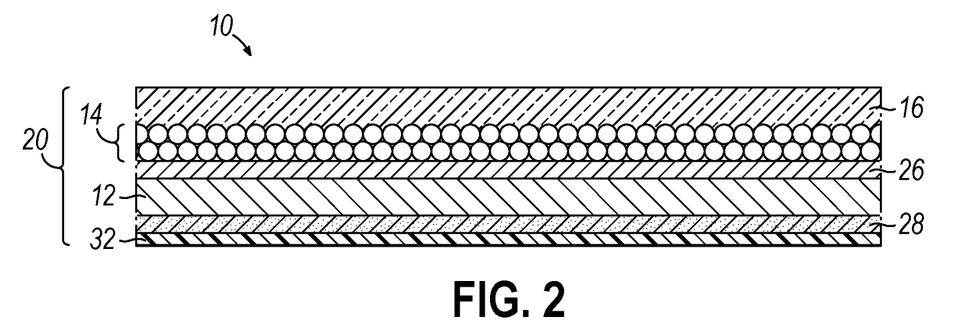
FIG. 2 is a cross-sectional view of one embodiment of a label for indicating exposure to a pressure.

Referring now to the illustrated embodiment of FIG. 2, the device 10 of this aspect of the present invention may further include an ink layer 26. In one embodiment, the ink layer 26 may be disposed between the plurality of microcapsules 14 and the base layer 12. The ink layer 26 may include one or more inks to form indicia (such as graphics, text, designs, etc.), and may be selected based on the particular needs of the device 10 or the particular indicia. Thus, any inks could be suitable for the ink layer 26, including but not limited to water based inks, solvent based inks, energy curable inks, flexo screen inks, and offset inks. The selection of such inks is within the knowledge of those of ordinary skill in the art.

Still referring to the embodiment of FIG. 2, the device 10 may further include an adhesive layer 28 disposed adjacent to the base layer 12 such that the base layer 12 is positioned between the adhesive layer 28 and the plurality of microcapsules 14. In one particular embodiment, the adhesive layer 28 includes an adhesive. In use, this adhesive may allow for bonding of the device 10 to an article 22 to be subjected to pressure. Such an adhesive may include an acrylic adhesive. One example of an acrylic adhesive suitable for the label 20 is S7000 adhesive, commercially available from Avery Dennison's Fasson Roll Division and used within typical pressure sensitive label products including (but not limited to) a construction including 2.4 mil white BOPP, an acrylic adhesive, and a 1.2 mil PET liner (such a construction is commercially available from Avery Dennison under specification #79481). However, it will be recognized by those of ordinary skill in the art that the properties of the adhesive—and thus the particular adhesive used—may be dictated at by the construction of the package being labeled (i.e., the material of the package that the adhesive will have to bond to).

Thus, the embodiment of the device 10 shown in FIG. 2 is a label 20 for application to an article 22 or articles 22 to indicate exposure to pressure (such as during HPP). The embodiment shown in FIG. 1 may also be applied to an article 22 via an adhesive (much like a label 20)—but may also be used with an article 22 or articles 22 without being affixed thereto (such as by being subjected to HPP along with any article 22 or articles 22, but separate from those articles 22). The embodiment in FIG. 2, however, may be a product label 20. For example the ink layer 26 can be used to provide the typical graphics of the label 20, while the microcapsules 14 can be used to provide indication of exposure to the appropriate pressure. Additionally, the microcapsules 14 may be arranged or printed on the device 10 or label 20 in such manner that the indicator material 18 therein forms visible indicia (e.g., text, graphics, etc.) one exposed to pressure and indicator material 18 released. Types of labels 20 that may be used in aspects of the present invention to provide an indication of exposure to pressure include a pressure sensitive label, an in-mold label, a heat transfer label, and a shrink sleeve label.

Figure 3:
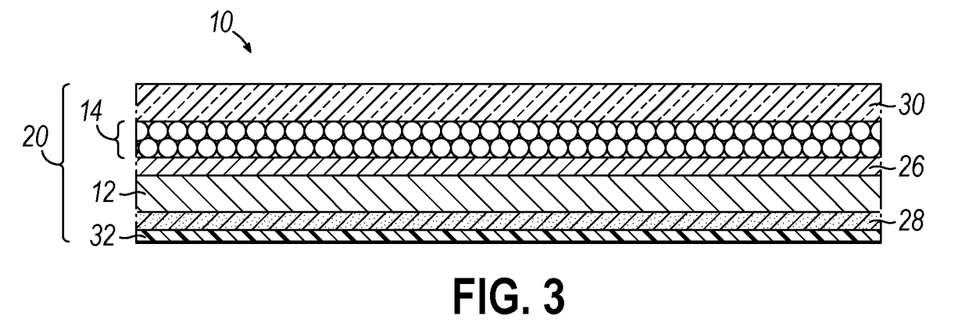
FIG. 3 is a cross-sectional view of another embodiment of a label for indicating exposure to a pressure.

Referring now to FIG. 3, in certain embodiments (where the label 20 is a pressure sensitive label 20 or an in-mold label 20, for example), the label 20 may include a base layer 12, a plurality of microcapsules 14, and a top layer 30, with the microcapsules 14 being disposed between the base layer 12 and the top layer 30. The label 20 further includes an adhesive layer 28 disposed adjacent to the base layer 12 such that the base layer 12 is positioned between the adhesive layer 28 and the plurality of microcapsules 14. The microcapsules 14 of this embodiment contain a indicator material 18 that can be released once the microcapsules 14 burst. The microcapsules 14 then have a compressive bursting strength that is chosen or designed to be less than a selected pressure (e.g., the pressure being that to which a particular article 22 may be exposed during HPP). Thus, when the label 20 is subjected to a pressure greater than the compressive bursting strength, at least some microcapsules 14 burst, the indicator material 18 is released from the microcapsules 14, and the release of the indicator material 18 can be detected by observation of the label 20 (which may be visual observation). The label 20 may also include a carrier sheet 32 disposed adjacent the adhesive layer 28, such that the adhesive layer 28 is positioned between the carrier sheet 32 and the base layer 12. In use, the remainder of the label would be removed from the carrier sheet 32 prior to being applied to an article 22.

As described above, the label 20 includes a base layer 12. In general, the base layer 12 may comprise a material such as those that would typically be used as facestock in one or more types of labels 20 (e.g., a pressure sensitive label 20). In certain embodiments, the base layer 12 may comprise a film or paper. In one particular embodiment, the base layer 12 may be a film including (but not limited to) polypropylene, biaxially-oriented polypropylene, and/or polyester. Further, the base layer 12 may be clear or opaque in certain embodiments. An example of a film that may be used as the base layer 12 is a 2.4 mil white biaxially-oriented polypropylene (BOPP) film, commercially available from Avery Dennison's Fasson Roll Division (of Avery Dennison, Glendale, Calif.) and used within typical pressure sensitive label products including (but not limited to) a construction including 2.4 mil white BOPP, an acrylic adhesive, and a 1.2 mil PET liner (such a construction is commercially available from Avery Dennison under specification #79481).

Further, as described, the label 20 includes a plurality of microcapsules 14 having a indicator material 18 therein. Processes for making microcapsules 14, and the materials used for same (including those containing solid and/or liquid reagents) are well known, and substantially any such methods and compositions can be used to make the microcapsules 14 of the label 20 described herein. As described above, the microcapsules 14 are located between the base layer 12, and top layer 30. The microcapsules 14 can, for example, be bound to the base layer 12, to the top layer 30, or to both, either directly or by way of a binding agent. Alternatively, the microcapsules 14 can be contained within, but not necessarily bound to any surface within the label 20.

The indicator material 18 disposed within the plurality of microcapsules 14 of the label 20 may be, for example, any substance that will undergo a color change (e.g., from clear to colored, or from one color to another color, or from colored to clear, etc.) either by itself, or when combined with another substance (e.g., the indicator material may be originally segregated from another substance within microcapsules, but brought into contact with such other substance once microcapsules burst and the indicator material is released). In one embodiment, the indicator material 18 disposed within the plurality of microcapsules 14 of the label 20 may include at least one ink. In one embodiment, the at least one ink may include a leuco dye. As is known to those of ordinary skill in the art a leuco dye is a dye which can switch between two chemical forms—one of which is colorless. Further, the ink (whether comprising a leuco dye or not) may be UV curable. An example of an ink that may be used as the at least one ink of the indicator material 18 is commercially available from Chromatic Technologies Incorporated, of Colorado Springs, Colo. under product number 9BOXX38E0327. Such an ink may include an acrylic oligomer, polyester acrylate, amine modified polyester acrylate, tripropylene glycol diacrylate, one or more photoinitiators, and a melamine polymer.

Alternatively to the use of a leuco dye that can change from colorless to colored upon the application of pressure, is the use of a color forming substance within the microcapsules 14, and a color developing substance outside the microcapsules 14. For example, in one embodiment, one of the base layer 12 and the coating 16 may include the microcapsules 14 adjacent thereto, and the other may include a color developer adjacent thereto that reacts with the indicator material 18 to generate a colored product upon release of the indicator material 18. By way of example, the indicator material 18 can be colorless or have a color different than (or less intense than) the colored product.

In other embodiments, the indicator material 18 may not be a material that forms a color (or a different color) upon exposure to pressure or exposure to a second substance. For example, the indicator material 18 may be a material that can be caused to fluoresce in order to determine if the device has been exposed to sufficient pressure to burst the microcapsules and release the indicator material.

Further, the label 20 of this embodiment of the present invention includes a top layer 30 adjacent the microcapsules 14 (such that the microcapsules 14 are disposed between the top layer 30 and the base layer 12). The top layer 30 may include a film. In one embodiment, the top layer 30 may include biaxially oriented polypropylene (BOPP)—i.e., a polypropylene film extruded and stretched in both the machine direction and across machine direction. Additionally, the top layer 30 may be of a clear material (which allows the indicator material 18—and any other indicia of any other inks—of the label 20 to be viewed). In another embodiment, the film of the top layer 30 may be a clear polyester (PET) film. One such film is 600T Thermal Transfer Printable Polyester Overlaminate, commercially available from ACPO, Ltd., of Oak Harbor, Ohio.

In other embodiments, the top layer 30 may be a coating 16 comprising a varnish (see FIG. 2). And, in certain embodiments, the top layer 30 may be UV-curable. In one particular embodiment, an example of a top layer 30 that may be used as the coating 16 is SunCure RCIFV0341665 (described in greater detail above), commercially available from Sun Chemical, of Parsippany, N.J.

Further, still referring to FIG. 3, the label 20 includes an adhesive layer 28 disposed adjacent to the base layer 12 such that the base layer 12 is positioned between the adhesive layer 28 and the plurality of microcapsules 14. In one particular embodiment, the adhesive layer 28 includes an adhesive. In use, this adhesive may allow for bonding of the label 20 to an article 22 to be subjected to pressure. Such an adhesive may include an acrylic adhesive. One example of an acrylic adhesive suitable for the label 20 is S7000 adhesive, commercially available from Avery Dennison's Fasson Roll Division and used within typical pressure sensitive label products including (but not limited to) a construction including 2.4 mil white BOPP, an acrylic adhesive, and a 1.2 mil PET liner (such a construction is commercially available from Avery Dennison under specification #79481). However, it will be recognized by those of ordinary skill in the art that the properties of the adhesive—and thus the particular adhesive used—may be dictated at by the construction of the package being labeled (i.e., the material of the package that the adhesive will have to bond to).

As described above, the microcapsules 14 are characterized by a compressive bursting strength (which may be a range of strengths for individual microcapsules 14 within the plurality) at which the indicator material 18 will be released from within the microcapsules 14. If a pressure (e.g., an anisotropic pressure, such as that in HPP) greater than the compressive bursting strength of the microcapsules 14 is applied to the microcapsules 14 (such as by the base layer 12 and/or the top layer 30), then the indicator material 18 will be released and can be detected. For that reason, the compressive bursting strength of the microcapsules 14 in a label 20 used for detecting achievement of a selected pressure should be not greater than (and preferably at least a little less than) that selected pressure to which the label 20 will be subjected.

In alternative embodiments, the microcapsules 14 can have a specified compressive bursting strength, or a range of compressive bursting strengths, as is known in the art. The compressive bursting strength can be selected, for example to be a fraction (e.g., half, 90%, 99%, or some other proportion) of the selected pressure of the process. In one embodiment, the compressive bursting strength that may be used can be determined empirically and can, for example, be about 5% of the selected pressure. As is known to those skilled in the art, HPP operates at very high pressures—e.g., 87,000 psi, 100,000 psi, etc. However, it may be the case that pressures that are only a fraction of the pressures of HPP—e.g., 5,000 psi—are pressures that would not be encountered by an article in the manufacturing, processing, shipping, or consumer stream unless they had crossed that threshold of pressure while being exposed to a process such as HPP. Thus, selection of a compressive bursting strength that is only, for example, 5% of the selected pressure (e.g., the pressure of HPP) can be enough to indicate that the article has undergone a high pressure process, such as HPP. However, this does not limit the compressive bursting strength to 5% of the selected pressure. Depending on need, any compressive bursting strength may be used, provided it is selected such that at least some of the microcapsules will burst at a pressure that is equal to or less than the selected pressure of the process. Further, because pressurization apparatus may fail or achieve only partial pressurization, the compressive bursting strength of the microcapsules 14 in the label 20 described herein (or at least some of the microcapsules) can instead be simply selected to be significantly greater than atmospheric pressure.

The label 20 described herein can include microcapsules 14 that exhibit a range of compressive bursting strengths. By way of example, the microcapsules 14 can include some which burst at a relatively low (e.g., 100 psi) compressive pressure and some which burst at a substantially greater (e.g., 87,000 psi) compressive pressure, and the two populations of microcapsules 14 can have the same or different indicator materials 18 contained within them. Furthermore, the two populations can be disposed on the same portion of the label 20 or in different portions. In one embodiment, the label 20 includes several populations of microcapsules 14, each having a characteristic range of compressive bursting strengths and being disposed in an arrangement that facilitates observation of their bursting, such as by arranging the populations sequentially in order of increasing compressive bursting strength and by including indicia on or within the label 20 that correlates color formation in one of the sequentially-ordered areas with a pressure.

At least one of the base layer 12 and the top layer 30 preferably has a viewing portion adapted to permit detection of indicator material 18 released from the microcapsules 14 by external visual observation of the label 20. In one particular embodiment, at least one of the base layer 12 and top layer 30 is sufficiently transparent or translucent that release of indicator material 18 from the microcapsules 14 can be detected by direct visual observation. As such (i.e., because the viewing portion of this embodiment is provided by the transparency or translucence of one or more materials of the label 20), it is not shown in the figures. However, in other embodiments, the label may include a viewing portion that is an opening (such as a window) such that any change, such as a color change, may be observed via such opening.

As described above, the indicator material 18 may include a leuco dye that changes from colorless to colored (certain embodiments may also include a color developer that interacts with the indicator material following rupture of the microcapsules in order to produce a visible color—or color of greater intensity, darker shade, etc.). In further embodiments, the indicator material 18 may also exhibit the ability to change from a colored ink to a colorless or clear ink when exposed to a particular temperature. This may be useful in applications where an article 22 needs to be pressurized (so as to reduce or eliminate any microorganisms) and then kept cool (as many foodstuffs need to be kept refrigerated). Once such an article 22 is subjected to HPP and then kept refrigerated (whether for transport or otherwise), the presence of coloration would indicate that the article 22 has been subjected to the desired or required pressure, and has also been kept at adequate temperature following HPP. In one embodiment, the indicator material 18 may revert from a colored state to colorless or clear following exposure to a temperature equal to or greater than a temperature chosen from 70° F., 104° F., 120° F., and 150° F.

The label 20 of this aspect of the present invention may further include an ink layer 26. In one embodiment, the ink layer 26 may be disposed between the plurality of microcapsules 14 and the base layer 12. The ink layer 26 may include one or more inks to form indicia (such as graphics, text, designs, etc.), and may be selected based on the particular needs of the label 20 or the particular indicia. Thus, any inks could be suitable for the ink layer 26, including but not limited to water based inks, solvent based inks, energy curable inks, flexo screen inks, and offset inks. The selection of such inks is within the knowledge of those of ordinary skill in the art.

Figure 4:
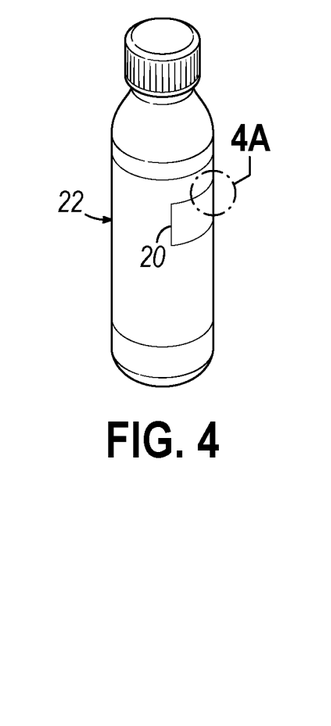
FIG. 4 is a perspective view showing an exemplary label associated with an article prior to exposure to pressure.
Figure 4A:
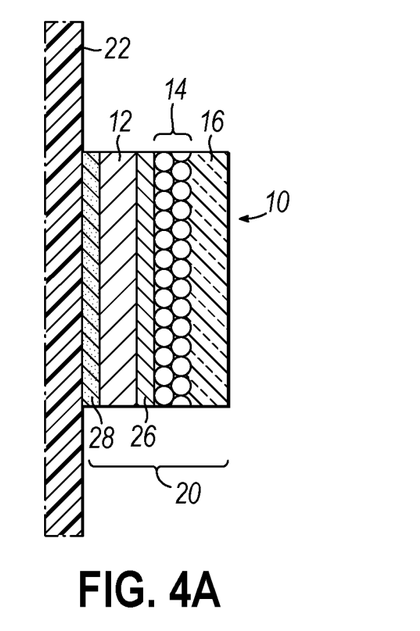
FIG. 4A is a cross-sectional view of area 4A of FIG. 4 showing an exemplary label associated with an article prior to exposure to pressure.
Figure 5:
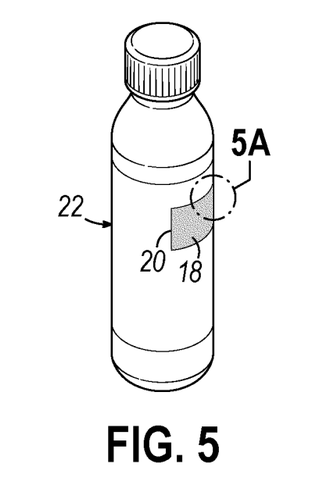
FIG. 5 is a perspective view showing an exemplary label associated with an article following exposure to a pressure in excess of the compressive bursting strength of microcapsules of the label.
Figure 5A:
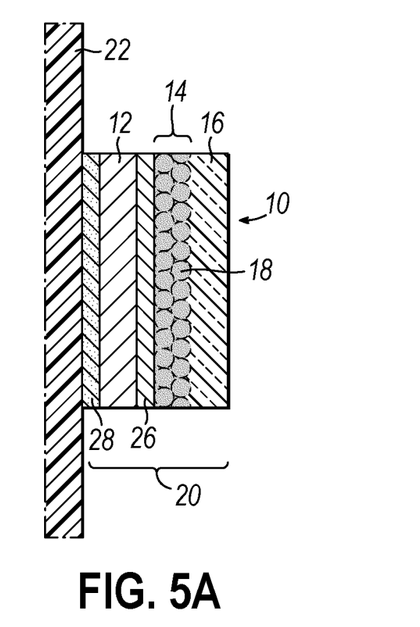
FIG. 5A is a cross-sectional view of area 5A of FIG. 5 showing an exemplary label associated with an article following exposure to a pressure in excess of the compressive bursting strength of microcapsules of the label

Referring now to FIGS. 4, 4A, 5, and 5A, the device 10 or label 20, as described herein, can be used in method of confirming achievement of a selected pressure in an method for treating a foodstuff using pressure (such as HPP). In particular, FIGS. 4, 4A, 5, and 5A shown the application and use of the embodiment of the label 20 of FIG. 2. FIGS. 4 and 4A show the application and use of the label 20 prior to exposure to a pressure (such as in HPP), and FIGS. 5 and 5A show the application and use of the label 20 following exposure to pressure (such as in HPP). The use of the label 20 generally includes associating the foodstuff (or other article 22) with the label 20, subjecting the foodstuff to increased pressure (such as in HPP), and thereafter observing the label 20 to determine if the indicator material 18 has been released, thereby indicating that the desired or requisite pressure was achieved.

As described above, the label 20 may first be associated with an article 22 (such as a foodstuff). In doing so, the label 20 may be associated with articles 22 such as a single foodstuff or package thereof (as shown in FIGS. 4 and 4A). In the illustrated embodiment this association is achieved by affixing the label 20 to a surface of the article 22 via the adhesive layer 28. Although the illustrated embodiment of FIGS. 4, 4A, 5, and 5A shows a single label 20 affixed to a single article 22, those of skill in the art will recognize that this configuration is not limiting, and other configurations of association may be used. For example, the label 20 can be associated with the foodstuff itself or with a plurality of foodstuffs or packages (e.g., a pallet of packages). Further, any method of association that will retain association of the device 10 (such as label 20) and foodstuff(s) during HPP treatment can be used. By way of example, a device 10 can simply be placed loose in the pressure chamber of an HPP device and left there with an article 22 or articles 22 until dissociation is desired. However, it may be desired that the device 10 (e.g., label 20) for indicating exposure to pressure remain associated with the article(s) 22 after they have been removed from pressure (such as HPP equipment). To achieve this, the device 10 (e.g., label 20) and article(s) 22 can be associated in any suitable way. By way of non-limiting examples, the device 10 can be adhered, tied, or otherwise attached to the article(s) 22 (e.g., foodstuff or package) or to a container or rack that contains the article(s) 22. The device 10 can be co-packaged with the foodstuff or used to seal a package or container containing the foodstuff, such that the foodstuff cannot be removed from the package or container without removing or breaking the device 10. Likewise, the device 10 can be part of, or contained within, a package used for commercial shipment, display, or sale of foodstuffs. By way of example, the device 10 can be sandwiched between two layers of flexible plastic film that are used to seal a foodstuff for retail sale. In such an arrangement, the device 10 is preferably sealed in a compartment distinct from (not fluidly communicable with) the compartment in which the foodstuff is sealed.

By associating the device 10 (e.g., label 20) and the article 22, the information displayed by the device 10 (i.e., whether or not proper HPP pressure was attained) can remain associated with the article 22 and inform downstream users (e.g., customers, food processing plant workers, or retailers) of the HPP status of the article 22.

Once the label 20 is associated with the article 22 (such as an article 22 containing a foodstuff), the article 22 and label 20 is subjected to an increased, desired pressure (such as via HPP). As described above, the microcapsules 14 may include a compressive bursting strength that is not greater than (and generally less than) that selected pressure to which the article 22 (and thus the label 20) will be subjected. When a pressure (e.g., an anisotropic pressure) greater than the compressive bursting strength of the microcapsules 14 is applied to the microcapsules 14 (such as by the base layer 12 and/or the coating 16, for example), then the indicator material 18 will be released. An embodiment of the label 20 in a state following exposure to pressure in excess of a compressive bursting strength is shown in FIGS. 5 and 5A.

Figure 6A:
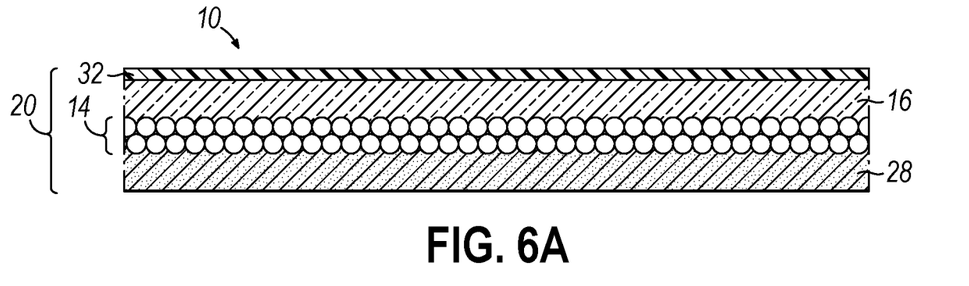
FIG. 6A is a cross-sectional view of one embodiment of a heat transfer label for indicating exposure to a pressure.
Figure 6B:
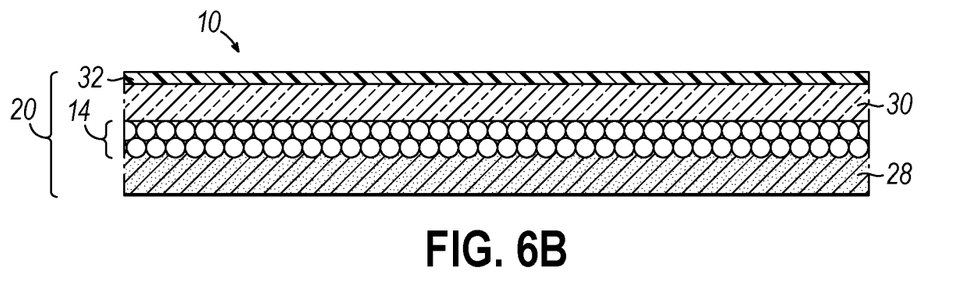
FIG. 6B is a cross-sectional view of another embodiment of a heat transfer label for indicating exposure to a pressure.

Referring now to FIGS. 6A and 6B, in another embodiment (where the label 20 is a heat transfer label 20, for example) the label 20 may include an adhesive layer 28, a plurality of microcapsules 14, and a top layer 30, the plurality of microcapsules 14 being disposed between the adhesive layer 28 and the top layer 30. The microcapsules 14 of this embodiment contain a indicator material 18 that can be released once the microcapsules 14 burst. The microcapsules 14 then have a compressive bursting strength that is chosen or designed to be less than a selected pressure (e.g., the pressure being that to which a particular article 22 may be exposed during HPP). Thus, when the label 20 is subjected to a pressure greater than the compressive bursting strength, at least some microcapsules 14 burst, the indicator material 18 is released from the microcapsules 14, and the release of the indicator material 18 can be detected by observation of the label 20. The top layer 30 may be a film, such as films that are typically used in heat transfer labels, and the adhesive layer 28, may include an adhesive such as those typically used with heat transfer labels—as is known to those of ordinary skill in the art.

Figure 7:
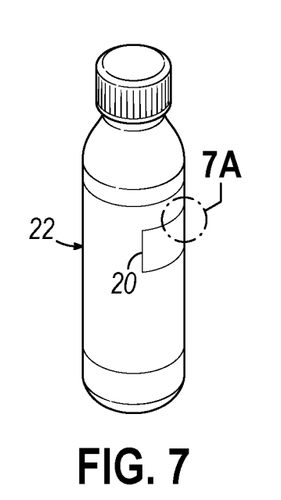
FIG. 7 is a perspective view showing an exemplary heat transfer label associated with an article prior to exposure to pressure.
Figure 7A:
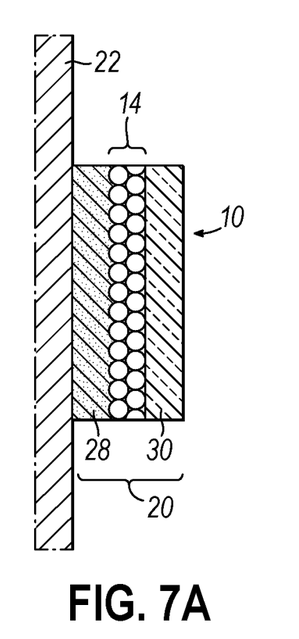
FIG. 7A is a cross-sectional view of area 7A of FIG. 7 showing an exemplary heat transfer label associated with an article prior to exposure to pressure.

Referring now to FIGS. 7 and 7A, the device 10 and/or label 20 shown in FIGS. 6A and 6B can be used in method of confirming achievement of a selected pressure in an method for treating a foodstuff using pressure (such as HPP). In particular, FIGS. 7 and 7A show the application and use of the embodiment of the label 20 of FIG. 6B. FIGS. 7 and 7A show the application and use of the label 20 prior to exposure to a pressure (such as in HPP). The use of the label 20 generally includes associating the foodstuff (or other article 22) with the label 20, subjecting the foodstuff to increased pressure (such as in HPP), and thereafter observing the label 20 to determine if the indicator material 18 has been released, thereby indicating that the desired or requisite pressure was achieved.

As described above, the label 20 may first be associated with an article 22 (such as a foodstuff). In doing so, the label 20 may be associated with articles 22 such as a single foodstuff or package thereof (as shown in FIGS. 7 and 7A). In the illustrated embodiment this association is achieved by affixing the label 20 to a surface of the article 22 via the adhesive layer 28. Although the illustrated embodiment of FIGS. 7 and 7A shows a single label 20 affixed to a single article 22, those of skill in the art will recognize that this configuration is not limiting, and other configurations of association may be used. For example, the label 20 can be associated with the foodstuff itself or with a plurality of foodstuffs or packages (e.g., a pallet of packages). Further, any method of association that will retain association of the device 10 and foodstuff(s) during HPP treatment can be used. By way of example, the device 10 can simply be placed loose in the pressure chamber of an HPP device and left there with an article 22 or articles 22 until dissociation is desired. However, it may be desired that the device 10 for indicating exposure to pressure remain associated with the article(s) 22 after they have been removed from pressure (such as HPP equipment). To achieve this, the device 10 and article(s) 22 can be associated in any suitable way. By way of non-limiting examples, the device 10 can be adhered, tied, or otherwise attached to the article(s) 22 (e.g., foodstuff or package) or to a container or rack that contains the article(s) 22. The device 10 can be co-packaged with the foodstuff or used to seal a package or container containing the foodstuff, such that the foodstuff cannot be removed from the package or container without removing or breaking the device 10. Likewise, the device 10 can be part of, or contained within, a package used for commercial shipment, display, or sale of foodstuffs. By way of example, the device 10 can be sandwiched between two layers of flexible plastic film that are used to seal a foodstuff for retail sale. In such an arrangement, the device 10 is preferably sealed in a compartment distinct from (not fluidly communicable with) the compartment in which the foodstuff is sealed.

By reliably associating the device 10 and the article 22, the information displayed by the device 10 (i.e., whether or not proper HPP pressure was attained) can remain associated with the article 22 and inform downstream users (e.g., customers, food processing plant workers, or retailers) of the HPP status of the article 22.

Once the label 20 is associated with the article 22 (such as an article 22 containing a foodstuff), the article 22 and label 20 is subjected to an increased, desired pressure (such as via HPP). As described above, the microcapsules 14 may include a compressive bursting strength that is not greater than (and preferably at least a little less than) that selected pressure to which the article 22 (and thus the label 20) will be subjected. When a pressure (e.g., an anisotropic pressure) greater than the compressive bursting strength of the microcapsules 14 is applied to the microcapsules 14 (such as by the article 22, adhesive 28 and/or the top layer 30, for example), then the indicator material 18 will be released. Following exposure to pressure in excess of a compressive bursting strength, the label 20 of FIG. 6B will show release of the indicator material 18 similar to that depicted in FIGS. 5 and 5A.

Figure 8:
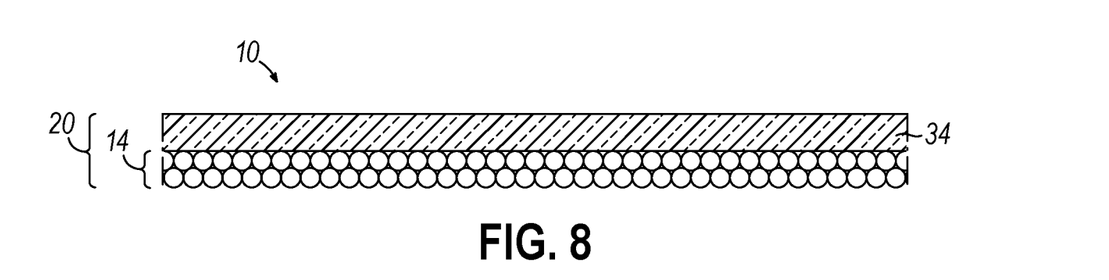
FIG. 8 is a cross-sectional view of one embodiment of a shrink sleeve label for indicating exposure to a pressure.

Referring now to FIG. 8, in another embodiment (where the label 20 is a shrink sleeve label 20, for example), the label 20 may include a shrink film 34 and a plurality of microcapsules 14 being disposed proximal to a surface of the shrink film 34. The shrink film 34 may include polyethylene terephthalate, polyethylene terephthalate glycol, polyvinyl chloride, oriented polystyrene, polyolefin, or combinations thereof, for example. The shrink film has an inherent tension that is released by heating the film from the outside in a shrink oven. The film may be oriented monoaxially (in a single direction). Decorations, such as pictures, logos, and/or text for labels, may be reverse-printed on the shrink film 34 and the shrink films may be seamed, thereby forming the shrink sleeve. The shrink film 34 may be reverse-printed using flexographic and rotogravure printing technology, for example. (Alternatively, the printing may occur proximal to an outer surface of the shrink film 34.)

The microcapsules 14 may be proximal to a surface of the shrink film. Further, the microcapsules 14 of this embodiment contain a indicator material 18 that can be released once the microcapsules 14 burst. The microcapsules 14 then have a compressive bursting strength greater than a first pressure achieved by shrinkage of the shrink film 34 to an article 22, but less than a selected second pressure (e.g., the pressure being that to which a particular article 22 may be exposed during HPP). Thus, when the label 20 is subjected to a pressure greater than the compressive bursting strength, at least some microcapsules 14 burst, the indicator material 18 is released from the microcapsules 14, and the release of the indicator material 18 can be detected by observation of the label 20.

Figure 9:
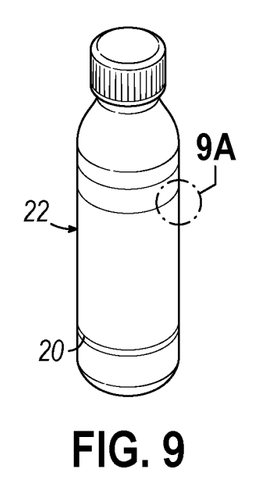
FIG. 9 is a perspective view showing an exemplary shrink sleeve label associated with an article prior to exposure to pressure.
Figure 9A:
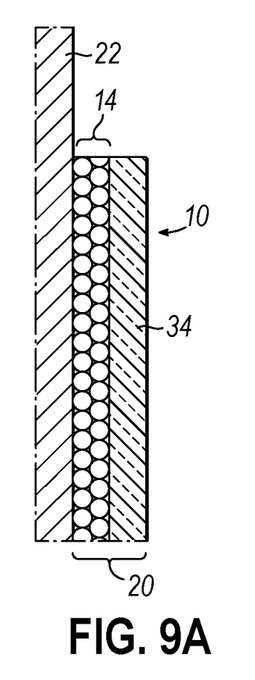
FIG. 9A is a cross-sectional view of area 9A of FIG. 9 showing an exemplary shrink sleeve label associated with an article prior to exposure to pressure.

Referring now to FIGS. 9 and 9A, the device 10 and/or label 20 shown in FIG. 8 can be used in method of confirming achievement of a selected pressure in an method for treating a foodstuff using pressure (such as HPP). FIGS. 9 and 9A show the application and use of the label 20 prior to exposure to a pressure (such as in HPP). The use of the label 20 generally includes associating the foodstuff (or other article 22) with the label 20, subjecting the foodstuff to increased pressure (such as in HPP), and thereafter visually observing the label 20 to determine if the indicator material 18 has been released, thereby indicating that the desired or requisite pressure was achieved.

As described above, the label 20 may first be associated with an article 22 (such as a foodstuff). In doing so, the label 20 may be associated with articles 22 such as a single foodstuff or package thereof (as shown in FIGS. 9 and 9A). In the illustrated embodiment this association is achieved by affixing the label 20 via the tension supplied by the shrink film 34 once it is shrunk around the article 22. Although the illustrated embodiment of FIGS. 9 and 9A shows a single label 20 affixed to a single article 22, those of skill in the art will recognize that this configuration is not limiting, and other configurations of association may be used. For example, the label 20 can be associated with the foodstuff itself or with a plurality of foodstuffs or packages. Further, any method of association that will retain association of the device 10 and foodstuff(s) during HPP treatment can be used.

By associating the device 10 and the article 22, the information displayed by the device 10 (i.e., whether or not proper HPP pressure was attained) can remain associated with the article 22 and inform downstream users (e.g., customers, food processing plant workers, or retailers) of the HPP status of the article 22.

Once the label 20 is associated with the article 22 (such as an article 22 containing a foodstuff), the article 22 and label 20 is subjected to an increased, desired pressure (such as via HPP). As described above, the microcapsules 14 may include a compressive bursting strength that is not greater than (and often less than) that selected pressure to which the article 22 (and thus the label 20) will be subjected. When an anisotropic pressure greater than the compressive bursting strength of the microcapsules 14 is applied to the microcapsules 14 (such as by the article 22 and/or the shrink film 34, for example), then the indicator material 18 will be released. Following exposure to pressure in excess of a compressive bursting strength, the label 20 of FIG. 8 will show release of the indicator material 18 similar to that depicted in FIGS. 5 and 5A.

Another aspect of the present invention is directed to an assembly for indicating achievement of a selected pressure in a high pressure process for treating a foodstuff. In one embodiment, the assembly provides a foodstuff associated with a device 10 (this can be seen in FIGS. 4, 5, 7, and 9). The device 10, in one embodiment (as seen in FIG. 4) includes a plurality of microcapsules 14, and a coating 16, with the microcapsules 14 being disposed between the base layer 12 and the coating 16. The microcapsules 14 of this embodiment contain a indicator material 18 that can be released once the microcapsules 14 burst. The microcapsules 14 then have a compressive bursting strength that is chosen or designed to be less than a selected pressure (e.g., the pressure being that to which a particular article 22 may be exposed during HPP). Thus, when the device 10 is subjected to a pressure greater than the compressive bursting strength, at least some microcapsules 14 burst, the indicator material 18 is released from the microcapsules 14, and the release of the indicator material 18 can be detected by visual observation of the device 10. The device 10 of this aspect of the invention may be a label 20 that is associated (such as by being affixed) to the article 22 being subjected to pressure (or multiple labels 20 being associated (such as by being affixed) to multiple articles 22. Alternatively, the device 10 may be associated with an article 22 or articles 22 without being affixed thereto (as a label 20 would be); such a device 10 may be subjected to HPP with the article 22 or articles 22 to indicate at the end of the process that a desired pressure was achieved during the process.

EXAMPLES

The subject matter of this disclosure is now described with reference to the following Examples. The Examples are provided for the purpose of illustration only, and the subject matter is not limited to the Examples, but rather encompasses all variations which are evident as a result of the teaching provided herein.

Example 1

The purpose of this Example 1 was to test whether a device as described in embodiments herein would provide a visible color change when subjected to pressures associated with High Pressure Processing (HPP).

To do this, a roughly rectangular piece of paper having dimensions of about 1.5 inches by about 5 inches was coated with a water-based pressure-activated indicator material supplied by Chromatic Technologies Incorporated, of Colorado Springs, Colo. This indicator material was not commercially available at the time of the testing, but is believed to be comprised of a water-based microencapsulated leuco dye system. An overlaminate, specifically product code 600T Thermal Transfer Printable Polyester Overlaminate, commercially available from ACPO, Ltd., of Oak Harbor, Ohio, was then applied on both surfaces of the coated paper.

Thus, the embodiment of the device used in this Example 1 included the following construction:

Overlaminate/paper/water-based pressure-activated indicator material/overlaminate This device was immersed in water placed within a PET (polyethylene terephthalate) bottle then subjected to pressure characteristic of HPP systems (approximately 87,000 psi). Following the pressurization and then depressurization, the effects on the device were observed, and the device displayed a vibrant color change (from clear to dark blue). The indicator color remained vibrant following processing, and did not dissipate. However, a further observation for this device is that the indicator color changed back to clear when subjected to temperatures above about 120° F. Without being limited to the specific physical processes, it is believed that the color reversion may be similar to the phase change observed in a thermochromic ink system.

This observation leads to additional aspects of the invention. First, embodiments may be created that exhibit a higher degree of temperature stability (without reversion of the indicator material to clear). For example, one might desire that any temperature stability be increased to about 140° F. to ensure that color change would not occur. Second, formulations of the indicator material may be provided that do exhibit color reversion at a lower temperature (for example at a temperature of perhaps around 70° F.). This could provide a technique to manage and monitor a cold-chain processes. For example, a package subjected to HPP process is effective to lengthen the shelf-life of the product within the package, but, to prevent spoilage requires that products be shipped in a refrigerated cold-chain. Incorporation of such a device that is transported by refrigerated truck would have a monitoring device that would demonstrate if the product was exposed to higher temperature. Thus, in this aspect of the invention, the HPP indicator material demonstrates that the package was sufficiently processed at the packaging facility (by changing color from clear to blue, for example) but, secondarily, the indicator material would demonstrate whether the packaged product was maintained in a refrigerated condition throughout the product shelf-life, as exposure to high enough temperature would cause the indicator color to revert from colored to clear. This information may be beneficial to the consumer or the processor.

This embodiment of the device was further evaluated with a mechanical means to apply pressure. A hydraulic press was used to apply pressure to the sample. No color change was observed at pressures below 1,000 psi. When higher pressure was applied (above 1,500 psi), color change was observed.

From the observations described in this Example 1, it was concluded that the device construction developed by the present inventors, and described herein, was suitable for detection of pressurization in HPP systems.

Example 2

In order to further evaluate whether a device as described herein would perform as desired and provide a visible color change with pressures associated with High Pressure Processing (HPP), an embodiment of the device as a more complete label construction was produced. Furthermore, an additional feature that was tested in this Example 2 was the ability to ensure that the indicator could not be arbitrarily activated by pressure unless the sample was subjected to HPP pressurization.

And so, the inventors designed and constructed a label including a indicator material that would only activate at higher pressures (e.g., higher than those in the hydraulic press test of Example 1). At the request of the inventors, Chromatic Technologies Incorporated reformulated the pressure indicator composition of Example 1 to the specifications of the inventors to increase the activation pressure above 5,000 psi. Although not disclosed to the inventors how the indicator system was reformulated, it is speculated that this was accomplished by increasing the wall thickness of the microcapsules to increase the pressure required for bursting.

In this Example 2, a roughly rectangular piece of a pressure sensitive label substrate, having dimensions of about 1.5 inches by 5 inches, was coated with the newly formulated pressure activated indicator material supplied by Chromatic Technologies Incorporated, of Colorado Springs, Colo. The indicator material supplied by Chromatic Technologies Incorporated was not commercially available at the time of the testing but is believed to be comprised of UV curable microencapsulated leuco dye system. As mentioned above, in this Example 2, the indicator material was applied to a pressure sensitive label substrate, specifically a white film pressure sensitive facestock layer (including biaxially oriented polypropylene—BOPP). Two different samples were produced, one sample with a clear UV cured varnish (SunCure RCIFV0341665, commercially available from Sun Chemical of Parsippany, N.J.) was applied on top of the pressure active indicator using a 360 linescreen, 6.0 bcm (billion cubic micron) volume anilox with a hand-proofing device. A second sample was produced by applying a clear overlaminate, specifically product code 600T Thermal Transfer Printable Polyester Overlaminate, commercially available from ACPO, Ltd., of Oak Harbor, Ohio, was applied to the pressure active indicator surface. Each sample also included an adhesive layer including a pressure-sensitive adhesive (PSA), and a carrier sheet to function as a liner for the label.

Thus, two different label constructions were evaluated in this Example 2. These two constructions were as follows:
1) Liner/PSA/White BOPP facestock/Pressure Activated indicator material/Overlaminate
2) Liner/PSA/White BOPP facestock/Pressure Activated indicator material/UV Cured Varnish The two samples were applied to the exterior of an article (by removing the liner layer, bringing the adhesive into contact with the article, and applying pressure) and each sample was then subjected to pressure characteristic of HPP systems (approximately 87,000 psi). Following the pressurization and then depressurization, the effects on the sample were observed.

Both samples displayed a vibrant color change (from clear to dark blue).

Following the subjugation of the samples to the HPP process, the sample was evaluated and passed an assessment of adhesion of the varnish coating using a cross-hatch tape test as described in ASTM D3359 Standard Test Method for Measuring Adhesion by Tape Test (incorporated by reference herein in its entirety) with the modification that 3M SCOTCH® Transparent Tape 600 was used.

These samples were further evaluated with a mechanical means to apply pressure. A hydraulic press was used to apply pressure to the sample. No color change was observed at pressures below 1,000 psi.

From the observations described in this Example 2, it was concluded that the device construction developed by the present inventors, and described herein, was suitable for detection of pressurization in HPP systems.

The embodiments of the present invention recited herein are intended to be merely exemplary and those skilled in the art will be able to make numerous variations and modifications to it without departing from the spirit of the present invention. Notwithstanding the above, certain variations and modifications, while producing less than optimal results, may still produce satisfactory results. All such variations and modifications are intended to be within the scope of the present invention as defined by the claims appended hereto.

What is claimed is:

1. A label for indicating exposure to a pressure, the label comprising:
   a base layer, a plurality of microcapsules, and a top layer, the microcapsules being disposed between the base layer and the top layer, the microcapsules containing a indicator material and having a compressive bursting strength less than a selected pressure; and
   an adhesive layer disposed adjacent to the base layer such that the base layer is positioned between the adhesive layer and the plurality of microcapsules;
   wherein the indicator material includes a UV curable ink;
   whereby when the label is subjected to a pressure greater than the compressive bursting strength, at least some microcapsules burst, the indicator material is released from the microcapsules, and the release of the indicator material is detected by observation of the label.

2. The label of claim 1, wherein at least one of the base layer and the top layer is formed from a material that permits detection of indicator material released from the microcapsules by observation of the label.

3. The label of claim 1, wherein the base layer includes a material chosen from a film and paper.

4. The label of claim 3, wherein the base layer includes a film chosen from polypropylene, biaxially-oriented polypropylene, and polyester.

5. The label of claim 4, wherein the ink can change from a colored ink to a colorless or clear ink when exposed to a temperature equal to or greater than a temperature chosen from 104° F., 120° F., and 150° F.

6. The label of claim 1, wherein the top layer is chosen from a film and a varnish.

7. The label of claim 6, wherein the top layer is UV-curable.

8. The label of claim 6, wherein the top layer is a film and includes polypropylene.

9. The label of claim 1, wherein the compressive bursting strength is equal to or less than a selected pressure to which the label will be subjected.

10. The label of claim 1, further comprising an ink layer.

11. The label of claim 10, wherein the ink layer is disposed between the plurality of microcapsules and the base layer.

12. The label of claim 11, wherein the adhesive layer includes at least one adhesive that is an acrylic adhesive.

13. The label of claim 1, wherein the label is a pressure sensitive label, a shrink sleeve label, or an in-mold label.

14. A label for indicating exposure to a pressure, the label comprising:
a base layer, a plurality of microcapsules, and a top layer, the microcapsules being disposed between the base layer and the top layer, the microcapsules containing a indicator material and having a compressive bursting strength less than a selected pressure; and
an adhesive layer disposed adjacent to the base layer such that the base layer is positioned between the adhesive layer and the plurality of microcapsules;
wherein the top layer is chosen from a film and a varnish, and wherein the top layer is UV-curable;
whereby when the label is subjected to a pressure greater than the compressive bursting strength, at least some microcapsules burst, the indicator material is released from the microcapsules, and the release of the indicator material is can be detected by observation of the label.

* * * * *

UNITED STATES PATENT AND TRADEMARK OFFICE
CERTIFICATE OF CORRECTION

PATENT NO. : 11,272,722 B2
APPLICATION NO. : 16/600656
DATED : March 15, 2022
INVENTOR(S) : Alexander Craig Bushman Page 1 of 2

It is certified that error appears in the above-identified patent and that said Letters Patent is hereby corrected as shown below:

In the Specification

Column 1, Line 58, "relative" should be --relatively--.

Column 2, Line 1, "ruptures" should be --rupture--.

Column 3, Line 7, "microcapsules" should be --microcapsules)--.

Column 3, Line 40, "(or" should be --or--.

Column 4, Line 56, "(or" should be --or--.

Column 6, Lines 24-26, "[or multiple labels 20 being associated to multiple articles 22 (such as by being affixed thereto]." should be --or multiple labels 20 being associated to multiple articles 22 (such as by being affixed thereto).--.

Column 9, Line 61, "at by" should be --by--.

Column 12, Line 23, "at by" should be --by--.

Column 14, Line 6, "an method" should be --a method--.

Column 14, Line 67, "is" should be --are--.

Column 15, Lines 34-36, "in method of confirming achievement of a selected pressure in an method" should be --in a method of confirming achievement of a selected pressure in a method--.

Column 16, Line 26, "is" should be --are--.

Column 17, Lines 5-6, "in method of confirming achievement of a selected pressure in an method"

Signed and Sealed this
Twenty-first Day of June, 2022

Katherine Kelly Vidal
*Director of the United States Patent and Trademark Office* should be --in a method of confirming achievement of a selected pressure in a method--.

Column 17, Line 40, "is" should be --are--.

In the Claims

Column 22, Line 24 (Claim 14), "is can be detected" should be --is detected--.